US012112874B2

(12) United States Patent
Jung et al.

(10) Patent No.: US 12,112,874 B2
(45) Date of Patent: Oct. 8, 2024

(54) INDUCTOR

(71) Applicant: SAMSUNG ELECTRONICS CO., LTD., Suwon-si (KR)

(72) Inventors: Sung-Bum Jung, Suwon-si (KR); Jeong Il Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 760 days.

(21) Appl. No.: 17/266,801

(22) PCT Filed: Aug. 9, 2019

(86) PCT No.: PCT/KR2019/010058
§ 371 (c)(1),
(2) Date: Feb. 8, 2021

(87) PCT Pub. No.: WO2020/036376
PCT Pub. Date: Feb. 20, 2020

(65) Prior Publication Data
US 2021/0343464 A1 Nov. 4, 2021

(30) Foreign Application Priority Data
Aug. 14, 2018 (KR) ........................ 10-2018-0094988

(51) Int. Cl.
*H01F 17/04* (2006.01)
*H01F 27/02* (2006.01)
(Continued)

(52) U.S. Cl.
CPC ........... *H01F 17/04* (2013.01); *H01F 27/022* (2013.01); *H01F 27/24* (2013.01); *H01F 27/266* (2013.01); *H01F 41/0206* (2013.01)

(58) Field of Classification Search
CPC ...... H01F 17/04; H01F 27/022; H01F 27/266; H01F 41/0206; H01F 27/327; H01F 27/263; H01F 27/306; H01F 3/10; H01F 27/29
See application file for complete search history.

(56) References Cited

U.S. PATENT DOCUMENTS 5,347,255 A 9/1994 Saitoh et al.
6,753,751 B2 6/2004 Fujiwara et al.
(Continued)

FOREIGN PATENT DOCUMENTS

JP 2017168564 A * 9/2017 ............ H01F 17/04
KR 200279789 Y1 6/2002
(Continued)

OTHER PUBLICATIONS

Communication dated Nov. 8, 2022 issued by the Korean Intellectual Property Office in Korean Application No. 10-2018-0094988.
(Continued)

*Primary Examiner* — Tuyen T Nguyen
(74) *Attorney, Agent, or Firm* — Sughrue Mion, PLLC

(57) ABSTRACT

The present disclosure relates to an inductor including a coil, an inner core disposed inside the coil, and an outer core formed in a rectangular ring shape to accommodate the coil and the inner core therein, wherein the inner core is manufactured separately from the outer core, and at least one end of both ends of the inner core in an axial direction is spaced apart from the outer core.

8 Claims, 11 Drawing Sheets

(51) Int. Cl.

| | |
|---|---|
| ***H01F 27/24*** | (2006.01) |
| ***H01F 27/26*** | (2006.01) |
| ***H01F 41/02*** | (2006.01) |

(56) References Cited

U.S. PATENT DOCUMENTS

| | | | | |
|---|---|---|---|---|
| 8,872,610 | B2 * | 10/2014 | Inaba ...................... | H01F 27/32 336/96 |
| 9,305,702 | B2 | 4/2016 | Sasamori et al. | |
| 9,536,653 | B2 | 1/2017 | Yamada et al. | |
| 10,037,845 | B2 | 7/2018 | Kim | |
| 10,229,783 | B2 | 3/2019 | Kang | |
| 2013/0307655 | A1 | 11/2013 | Saito et al. | |
| 2014/0368306 | A1 | 12/2014 | Kang | |
| 2016/0005520 | A1 | 1/2016 | Cheng | |
| 2017/0140868 | A1 | 5/2017 | Kim | |
| 2019/0006078 | A1 | 1/2019 | Sakai et al. | |

FOREIGN PATENT DOCUMENTS

| | | | | |
|---|---|---|---|---|
| KR | 20-0352340 | Y1 | 6/2004 | |
| KR | 10-2014-0146405 | A | 12/2014 | |
| WO | WO-2013018381 | A1 * | 2/2013 | ........... H01F 27/255 |
| WO | 2016/003190 | A1 | 1/2016 | |
| WO | WO-2017047740 | A1 * | 3/2017 | ............. H01F 17/04 |

OTHER PUBLICATIONS

Communication dated Jan. 12, 2023 issued by the Korean Intellectual Property Office in Korean Application No. 10-2018-0094988.

International Search Report (PCT/ISA/210) issued Dec. 9, 2019 by the International Searching Authority in counterpart International Patent Application No. PCT/KR2019/010058.

Written Opinion (PCT/ISA/237) issued Dec. 9, 2019 by the International Searching Authority in counterpart International Patent Application No. PCT/KR2019/010058.

* cited by examiner

INDUCTOR

TECHNICAL FIELD

The present disclosure relates to an inductor capable of generating an induced electromotive force by changing current over time.

BACKGROUND ART

An inductor is an apparatus that may generate an induced electromotive force by changing current over time.

The inductor includes a coil wound in a hollow cylindrical shape, an inner core disposed inside the coil, and an outer core accommodating the coil and the inner core therein.

The inductor is manufactured by separately manufacturing an upper core integrally formed with an upper inner core part and an upper outer core part and a lower core integrally formed with a lower inner core part and a lower outer core part, and then fixing the coil to the upper and lower cores.

An inductance of the inductor varies depending on a thickness of an air layer formed between a lower end of the upper inner core part and an upper end of the lower inner core part.

Therefore, in order to manufacture an inductor having a different inductance, it is necessary to grind the upper inner core part and the lower inner core part to adjust lengths thereof, making it inconvenient to manufacture the inductor.

In addition, in order to manufacture various inductors with different inductances, management is inconvenient because upper cores having upper inner core parts grinded to various lengths and lower cores having lower inner core parts grinded to various lengths need to be manufactured, respectively.

DISCLOSURE

Technical Problem

The present disclosure is directed to providing an inductor capable of being easily manufactured with more various specifications.

Technical Solution

An aspect of the present disclosure provides an inductor including a coil wound in a hollow form, an inner core formed to have a cross-sectional shape corresponding to an inner surface of the coil and disposed inside the coil, and an outer core formed in a rectangular ring shape to accommodate the coil and the inner core therein, wherein the inner core is manufactured separately from the outer core, and at least one end of both ends of the inner core in an axial direction is spaced apart from the outer core.

Both ends of the inner core in the axial direction may be spaced apart from an inner surface of the outer core.

A length of the inner corner in the axial direction may be shorter than a length of the coil in the axial direction.

The inductor may further include a support including the coil and the inner core therein through insert injection molding, wherein the support may be provided with openings on both surfaces thereof to allow both ends of the inner core to be exposed.

The support may be formed in a rectangular parallelepiped shape and may further include a plurality of pins connected to the coil.

The outer core may include a pair of guide portions protruding from an inner surface thereof to correspond to both ends of the inner core in the axial direction.

The support may include a pair of guide grooves concavely formed at positions corresponding to the pair of guide portions and extending long in a direction in which the support is inserted into the outer core.

The inductor may further include a bobbin in which the inner core is fixed and on which the coil is wound.

The support may include a stopper protruding from one end of the support to limit the support to be inserted into the outer core by a predetermined length or more, and fixing slots concavely formed on both side surfaces of the other end of the support, respectively, and the support may further include a fixing clip formed in a U shape and fitted into the fixing slots.

Another aspect of the present disclosure provides a method of manufacturing an inductor including preparing a hollow coil by winding a wire, preparing an inner core, fixing the inner core inside the coil, and inserting and fixing the coil and the inner core into and to the outer core formed in a rectangular ring shape.

The preparing the coil and the fixing the inner core inside the coil may be performed by fixing the inner core to a bobbin and winding the wire on the bobbin.

The inserting the coil and the inner core into the outer core may be performed by forming a support having the coil and the inner core disposed therein through insert injection molding and inserting the support into the outer core.

The method may further include forming openings, corresponding to both ends of the inner core, respectively, on both surfaces of the support in the process of forming the support.

The method may further include fixing pins connected to the coil to the support in the process of forming the support.

The method may further include bending the pins in one direction.

Advantageous Effects

In an inductor according to the present disclosure, an inner core and an outer core are separately manufactured, so that inductors of various specifications can be easily manufactured by changing a length or material of the inner core.

Further, in the inductor according to the present disclosure, the inner core does not need to be grinded to adjust a thickness of an air layer, so that manufacturing is simple.

Further, in the inductor according to the present disclosure, inductors of various specifications can be easily manufactured by applying inner cores having various lengths.

Further, the inductor according to the present disclosure includes a support formed by insert injection molding together with a core, so that processes such as taping and impregnation for fixing the core can be omitted.

MODE OF THE DISCLOSURE

Figure 1:
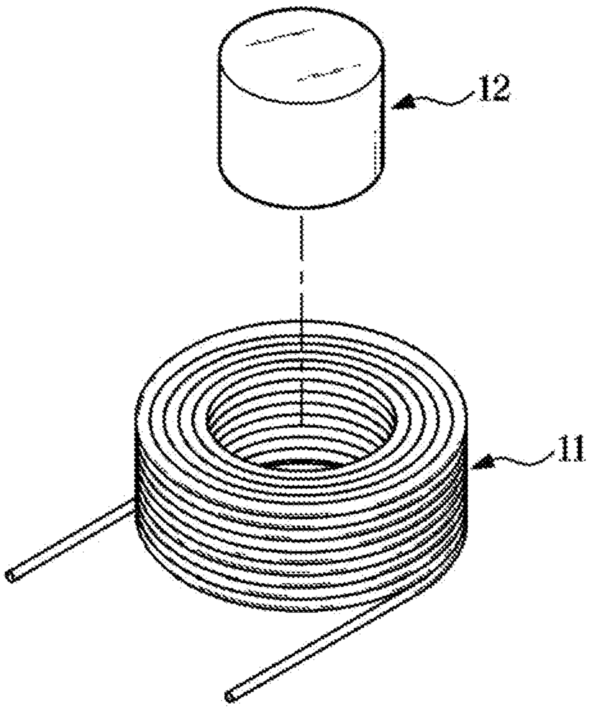
FIG. 1 is a perspective view illustrating that a coil and an inner core are coupled in an inductor according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to limit the present disclosure. For example, the singular expressions herein may include plural expressions, unless the context clearly dictates otherwise. Also, the terms “comprises” and “has” are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term “and/or” includes any combination of a plurality of related items or any one of a plurality of related item s.

In this specification, the terms “front end,” “rear end,” “upper portion,” “lower portion,” “upper end” and “lower end” used in the following description are defined with reference to the drawings, and the shape and position of each component are not limited by these terms.

Hereinafter, an inductor according to an embodiment of the present disclosure will be described in detail with reference to the accompanying drawings.

Figure 5:
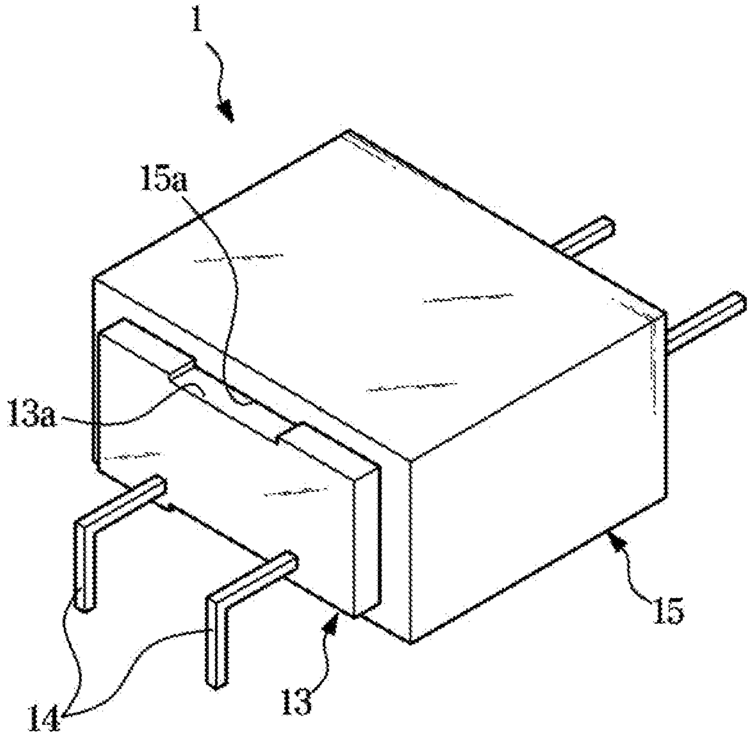
FIG. 5 is a perspective view illustrating a state in which the pins are bent in the inductor according to an embodiment of the present disclosure.
Figure 6:
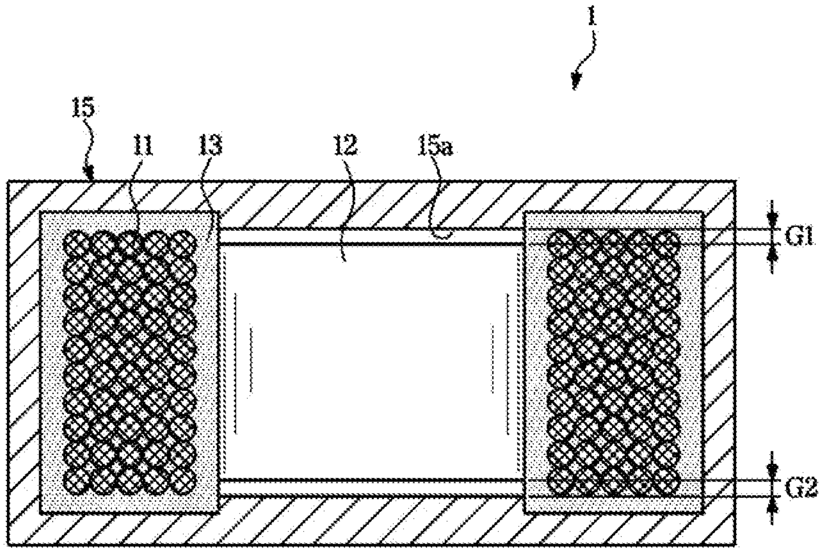
FIG. 6 is a cross-sectional view of the inductor according to an embodiment of the present disclosure.

As illustrated in FIGS. 5 and 6, an inductor according to the present disclosure includes a coil 11 formed by winding a wire, an inner core 12 disposed inside the coil 11, a support 13 supporting the coil 11 and the inner core 12, and an outer core 15 formed in a rectangular ring shape and accommodating the support 13 including the coil 11 and the inner core 12 therein.

The coil 11 is formed in a substantially hollow cylindrical shape by winding a self-bonding wire coated with an adhesive on a surface thereof. However, the present disclosure is not limited thereto, and a cylindrical coil may be formed through another method.

The inner core 12 is formed in a cylindrical shape by a ferromagnetic material such as ferrite, and an axial length thereof (vertical length in the drawing) is formed to be shorter than an axial length of the coil 11 (vertical in the drawing).

Therefore, when the coil 11 and the inner core 12 are installed inside the outer core 15, both ends of the inner core 12 in the axial direction, that is, at least one end of upper and lower ends of the inner core 12 in the drawing is spaced apart from an inner surface of the outer core 15.

In the present embodiment, the inner core 12 is installed in the center of the coil 11, so that the upper end of the inner core 12 is spaced apart from an upper inner surface of the outer core 15 to form an air layer therebetween, and the lower end of the inner core 12 is spaced apart from a lower inner surface of the outer core 15 to form an air layer therebetween. That is, air layers are formed on an upper side and a lower side of the inner core 12 with the inner core 12 as the center, respectively.

It is appropriate that a thickness G1 of the air layer formed on the upper side of the inner core 12 and a thickness G2 of the air layer formed on the lower side of the inner core 12 are the same. This is to allow the same level of heat to be generated in the upper and lower portions of the outer core 15 because the amount of heat generated in the upper and lower portions of the outer core 15 adjacent to the air layers varies depending on the thickness of the air layers.

As described above, the thickness G1 of the air layer formed on the upper side of the inner core 12 and the thickness G2 of the air layer formed on the lower side of the inner core 12 are the same, but the present disclosure is limited thereto, and the thickness G1 of the upper air layer and the thickness G2 of the lower air layer may be formed differently from each other.

The support 13 is formed of an insulating material such as resin, and the coil 11 and the inner core 12 are fixed therein through insert injection molding. Therefore, processes such as taping and impregnation for fixing the coil 11 may be omitted.

A plurality of pins 14 connected to the coil 11 through insert injection molding is also fixed to the support 13. The pins 14 allow the coil 11 to be connected to a substrate (not shown) or the like.

The support 13 is formed in a substantially rectangular parallelepiped shape so that the pins 14 may be installed on both sides thereof while including the coil 11 and the inner core 12 therein.

The outer core 15 is formed of a ferromagnetic material such as ferrite. In the present embodiment, the outer core 15 is formed of the same material as the inner core 12.

The outer core 15 is formed in a substantially rectangular ring shape to correspond to an outer surface of the support 13 having a rectangular parallelepiped shape, and has a width corresponding to the support 13.

The outer core 15 includes a pair of guide portions 15*a* protruding from the inner surfaces thereof to correspond to both ends of the inner core 12 in the axial direction. That is, the pair of guide portions 15*a* protrude from the inner upper and lower surfaces of the outer core 15 to correspond to the upper and lower ends of the inner core 12, thereby guiding magnetic flux acting between the inner core 12 and the outer core 15 to improve the flow of the magnetic flux. In this case, the guide portions 15*a* are spaced apart from both ends of the inner core 12 in the axial direction, respectively.

The support 13 includes a pair of guide grooves 13*a* provided at positions corresponding to the pair of guide portions 15*a*. The guide grooves 13*a* are concavely formed on upper and lower surfaces of the support 13, respectively, and extend long in a direction in which the support 13 is inserted into the outer core 15. Accordingly, the insertion of the support 13 into the outer core 15 is guided by the guide portions 15*a* and the guide grooves 13*a*. As described above, the inner core 12 and the outer core 15 are separately manufactured. Therefore, when the inner cores 12 of various lengths are applied to the same outer core 15, the thicknesses of the air layers formed between both ends of the inner core 12 and the inner surfaces of the outer core 15 are changed. Therefore, by applying the inner cores 12 having various lengths, inductors of various specifications may be manufactured simply.

In the present embodiment, the inner core 12 and the outer core 15 are formed of the same material, but are not limited thereto. As described above, because the inner core 12 and the outer core 15 are separately manufactured, the inner core 12 may be formed to have various materials having different magnetic permeability while the inner core 12 has a constant length. That is, by changing the material of the inner core 12, inductors of various specifications may be manufactured simply.

As described above, the coil 11 is formed in a hollow cylindrical shape, and the inner core 12 is formed in a cylindrical shape. That is, both the hollow of the coil 11 and the inner core 12 have a circular cross section. However, this is an example and is not limited thereto.

The hollow of the coil and the inner core may be formed to have a substantially rectangular cross-sectional shape corresponding to each other, or may be formed to have an elliptical cross-section corresponding to each other. That is, the cross sections of the hollow of the coil and the inner core may be formed in various shapes corresponding to each other.

As described above, the inner core 12 is directly fixed in the hollow coil 11, but this is an example and is not limited thereto.

Figure 7:
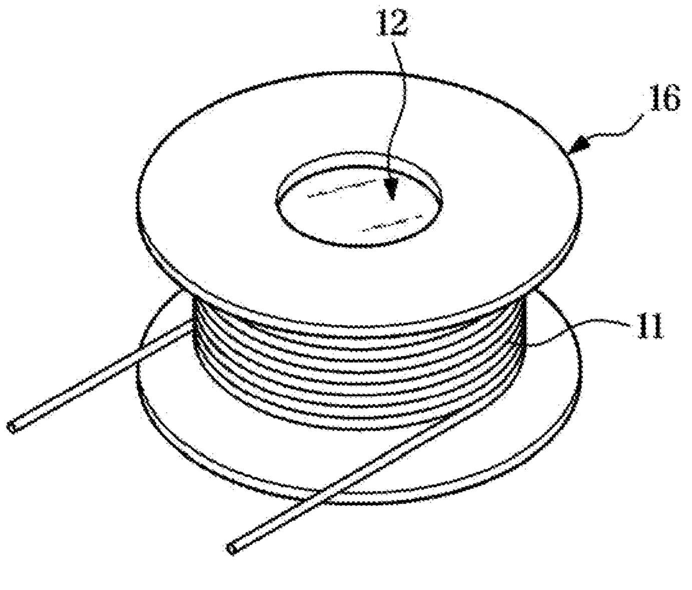
FIG. 7 is a perspective view illustrating a process in which the coil is wound on a bobbin applied to an inductor according to another embodiment of the present disclosure.
Figure 8:
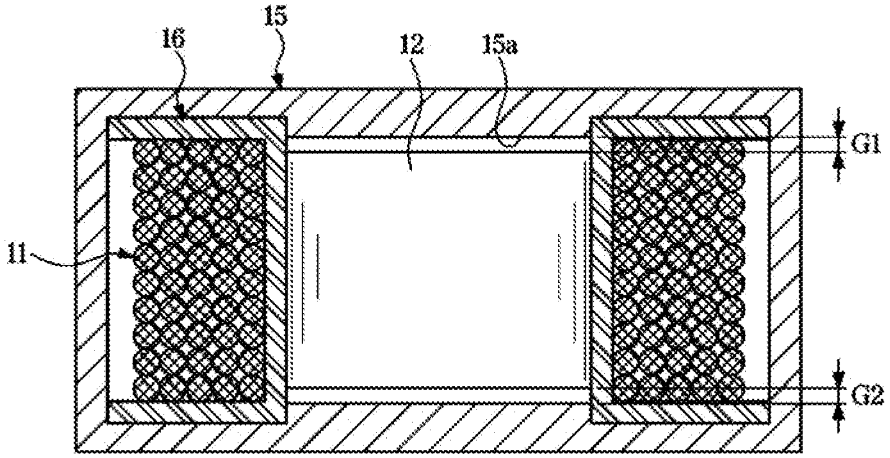
FIG. 8 is a cross-sectional view of the inductor according to another embodiment of the present disclosure.

That is, as illustrated in FIGS. 7 and 8, as a bobbin 16 for winding the coil 11 is prepared, and the inner core 12 is fixed in the bobbin 16, and then the coil 11 is wound around the bobbin 16, the inner core 12 may be installed inside the coil 11. The inner core 12 may be fixed by insert injection with the bobbin 16 or may be bonded to the bobbin 16 through an adhesive or the like.

Hereinafter, a method of manufacturing an inductor according to the present disclosure will be described with reference to the drawings.

First, as illustrated in FIG. 1, the coil 11 formed in a substantially hollow cylindrical shape is prepared by winding the self-bonding wire coated with an adhesive on a surface thereof, and the inner core 12 having a length shorter than that of the coil 11 is prepared. Next, the inner core 12 is fixed inside the coil 11. When the inner core 12 is installed on an inner center side of the coil 11, the upper end of the inner core 12 is positioned below an upper end of the coil 11, and the lower end of the inner core 12 is positioned above a lower end of the coil 11 (see FIG. 6).

Figure 2:
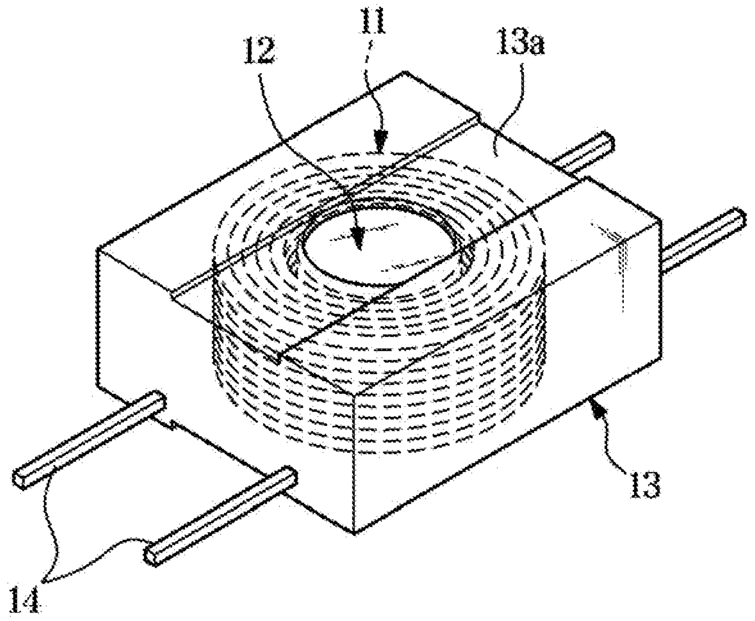
FIG. 2 is a perspective view illustrating a support to which the coil, the inner core, and pins are fixed in the inductor according to an embodiment of the present disclosure.

After the inner core 12 is fixed inside the coil 11, as illustrated in FIG. 2, the support 13 in which the inner core 12 and the coil 11 are fixed therein and the pins 14 are fixed in a state of protruding to the outside thereof is formed through insert injection molding.

In the process of insert injection molding the support 13, openings are provided on the upper and lower surfaces of the support 13 at positions corresponding to the upper and lower ends of the inner core 12, respectively, so that the upper and lower ends of the inner core 12 are exposed.

Figure 3:
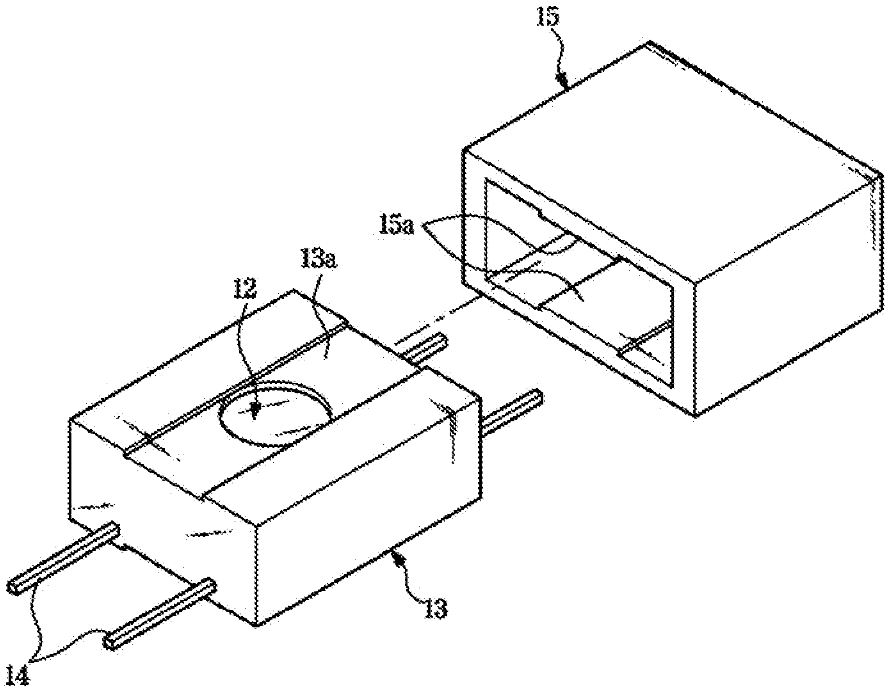
FIG. 3 is an exploded perspective view illustrating that the support is installed in an outer core in the inductor according to an embodiment of the present disclosure.
Figure 4:
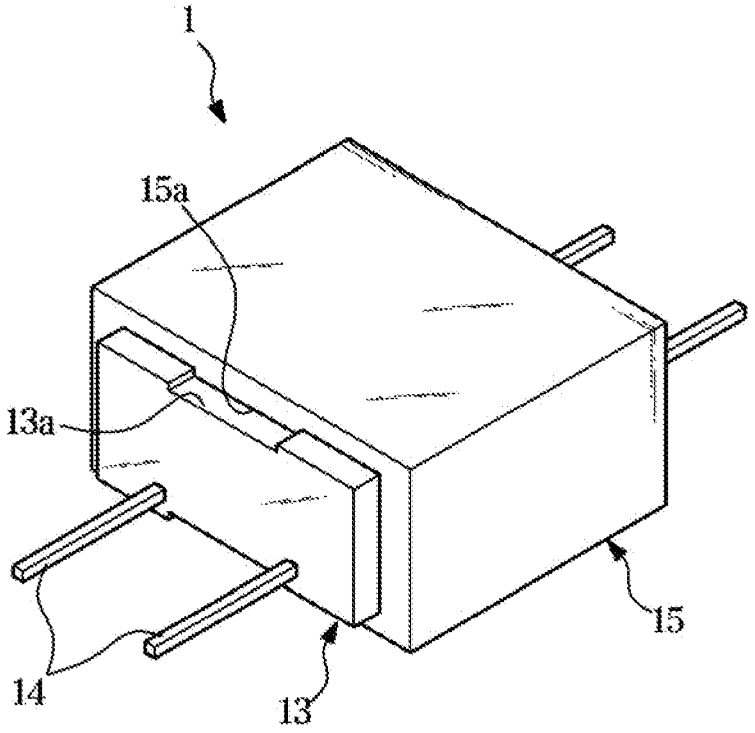
FIG. 4 is a perspective view illustrating a state in which the support is installed in the outer core in the inductor according to an embodiment of the present disclosure.

As illustrated in FIGS. 3 and 4, the support 13 including the inner core 12 and the coil 11 is inserted into the outer core 15 and fixed in the outer core 15 through bonding or the like.

Finally, as illustrated in FIG. 5, when the pins 14 are bent downward to be deformed in a form in which the inductor may be easily connected to the substrate, manufacturing of the inductor is completed.

As described above, the preparation of the coil 11 is performed as the self-bonding wire is wound, but in a case where the inductor includes the bobbin 16, as illustrated in FIG. 7, the preparation of the coil 11 is performed as the inner core 12 is fixed inside the bobbin 16 and a wire is wound around the bobbin 16 to form a coil 11. In the present embodiment, after the inner core 12 is fixed to the bobbin 16, the coil 11 is formed on the bobbin 16, but may be performed in the reverse order.

As described above, the support 13 is fixed in the outer core 15 through bonding, but is not limited thereto.

Figure 9:
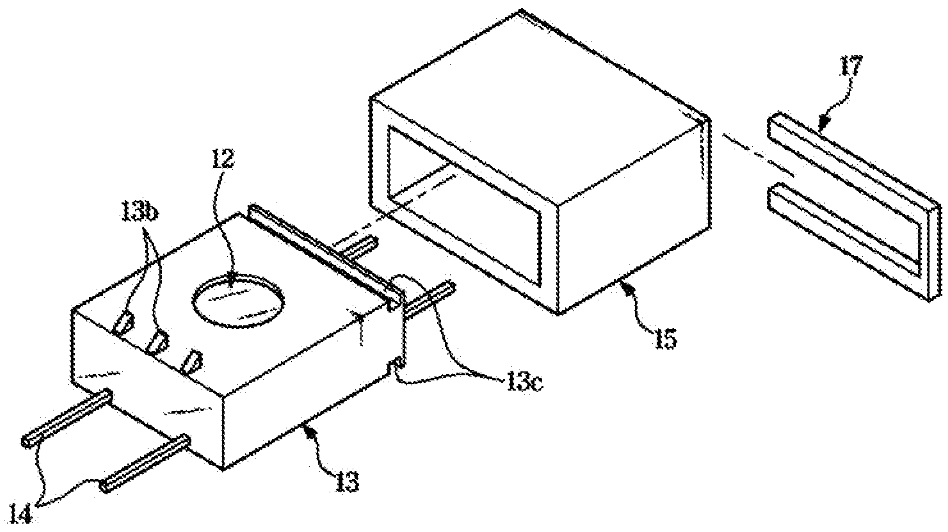
FIG. 9 is an exploded perspective view illustrating that a support is installed in an outer core in an inductor according to another embodiment of the present disclosure.
Figure 10:
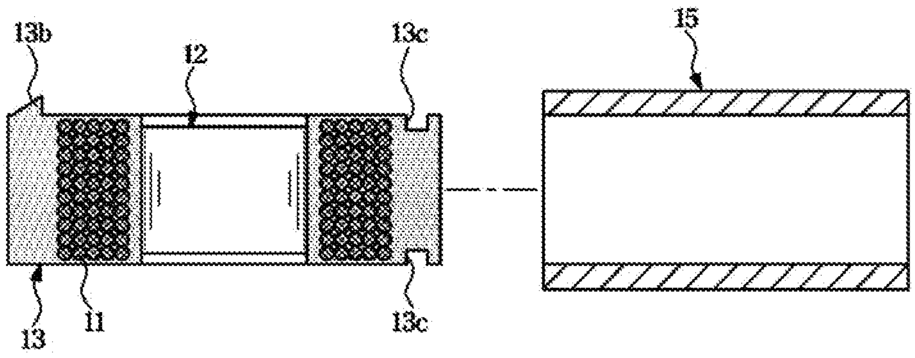
FIG. 10 is a cross-sectional view illustrating that the support is installed in the outer core in the inductor according to another embodiment of the present disclosure.

As illustrated in FIGS. 9 and 10, the inductor includes a fixing clip 17, and the support 13 may be fixed to the outer core 15 through the fixing clip 17.

The support 13 includes stoppers 13*b* protruding from the upper and lower surfaces of one end of the support 13, and fixing slots 13*c* provided on the upper and lower surfaces of the other end of the support 13.

The fixing clip 17 is formed in a substantially lay-down U shape so that the upper and lower portions of the fixing clip 17 are fitted into fixing slots 13*c* provided on the upper and lower surfaces of the support 13.

Figure 11:
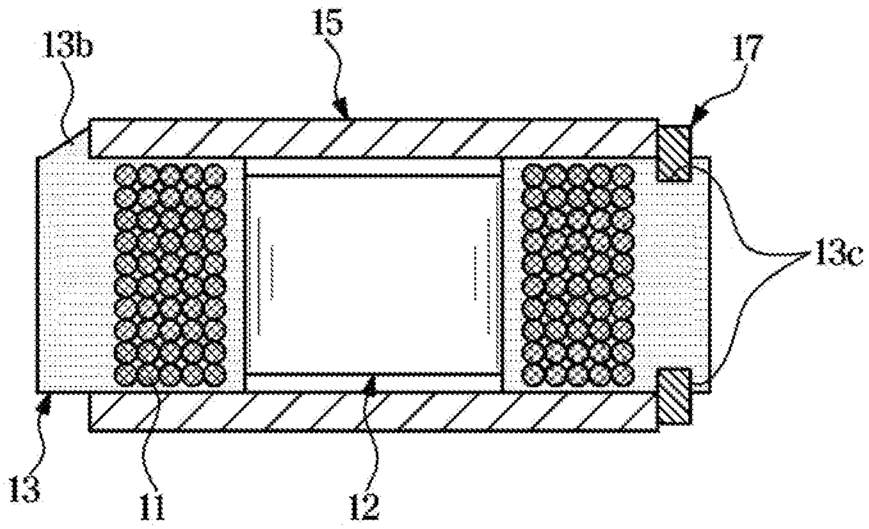
FIG. 11 is a cross-sectional view illustrating a state in which the support is installed in the outer core in the inductor according to another embodiment of the present disclosure.

Therefore, as illustrated in FIG. 11, when the support 13 is inserted into the outer core 15 by a predetermined length or more, the stoppers 13*b* provided at one end of the support 13 are caught on one surface (front surface in the drawing) of the outer core 15, so that additional insertion of the support 13 is limited.

As described above, the additional insertion of the support 13 is limited through the stoppers 13*b* provided on the support 13, but is not limited thereto. Instead of the configuration in which the stopper 13*b* is provided on the support 13, additional insertion of the support 13 may be limited through a configuration in which the stopper 13*b* is formed on the outer core 15.

In this state, when the fixing clip 17 is fitted into the fixing slots 13*c* provided at the other end of the support 13, the fixing clip 17 is caught on the other surface (rear surface in the drawing) of the outer core 15, so that the support 13 is prevented from being separated from the outer core 15 by the fixing clip 17.

While the present disclosure has been particularly described with reference to exemplary embodiments, it should be understood by those of skilled in the art that various changes in form and details may be made without departing from the spirit and scope of the present disclosure.

The invention claimed is:

1. An inductor comprising:

a coil wound in a hollow form;

an inner core formed to have a cross-sectional shape corresponding to an inner surface of the coil and disposed inside the coil;

an outer core formed in a rectangular ring shape to accommodate the coil and the inner core therein; and a support comprising the coil and the inner core therein through insert injection molding, wherein the inner core is manufactured separately from the outer core, and at least one end of both ends of the inner core in an axial direction is spaced apart from the outer core, and wherein the support further comprises:

a stopper protruding from one end of the support to limit the support to be inserted into the outer core by a predetermined length or more, fixing slots concavely formed on both side surfaces of another end of the support, respectively, and a fixing clip formed in a U shape and fitted into the fixing slots.

2. The inductor according to claim 1, wherein both ends of the inner core in the axial direction are spaced apart from an inner surface of the outer core.

3. The inductor according to claim 1, wherein a length of the inner core in the axial direction is shorter than a length of the coil in the axial direction.

4. The inductor according to claim 1, wherein the support is provided with openings on both surfaces thereof to allow both ends of the inner core to be exposed.

5. The inductor according to claim 1, wherein the support is formed in a rectangular parallelepiped shape and further comprises a plurality of pins connected to the coil.

6. The inductor according to claim 1, wherein the outer core comprises a pair of guide portions protruding from an inner surface thereof to correspond to both ends of the inner core in the axial direction.

7. The inductor according to claim 6, wherein the support comprises a pair of guide grooves concavely formed at positions corresponding to the pair of guide portions and extending long in a direction in which the support is inserted into the outer core.

8. The inductor according to claim 1, further comprising a bobbin in which the inner core is fixed and on which the coil is wound.

* * * * *